US010185323B2

(12) United States Patent
Stefan

(10) Patent No.: US 10,185,323 B2
(45) Date of Patent: Jan. 22, 2019

(54) SYSTEM AND METHOD TO REDUCE VEHICLE RESOURCE DEPLETION RISK

(71) Applicant: GM GLOBAL TECHNOLOGY OPERATIONS LLC, Detroit, MI (US)

(72) Inventor: Jeffrey M. Stefan, Clawson, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/611,250

(22) Filed: Jun. 1, 2017

(65) Prior Publication Data

US 2018/0348772 A1 Dec. 6, 2018

(51) Int. Cl.
| | | |
|---|---|---|
| G05D 1/00 | (2006.01) | |
| G06D 1/02 | (2006.01) | |
| G08G 1/00 | (2006.01) | |
| G01C 21/34 | (2006.01) | |
| G06Q 10/06 | (2012.01) | |
| G05D 1/02 | (2006.01) | |

(52) U.S. Cl.
CPC ....... G05D 1/0217 (2013.01); G01C 21/3438 (2013.01); G05D 1/0276 (2013.01); G05D 1/0291 (2013.01); G06Q 10/0635 (2013.01); G06Q 10/06315 (2013.01); G08G 1/202 (2013.01); G05D 1/0088 (2013.01)

(58) Field of Classification Search
CPC .. G05D 1/0217; G05D 1/0276; G05D 1/0291; G05D 1/0088; G01C 21/3438; G06Q 10/06315; G06Q 10/0635; G08G 1/202
See application file for complete search history.

(56) References Cited

U.S. PATENT DOCUMENTS

| | | | |
|---|---|---|---|
| 6,625,539 B1* | 9/2003 | Kittell | B60L 3/12 701/117 |
| 2011/0068895 A1 | 3/2011 | Gee | |
| 2013/0024060 A1* | 1/2013 | Sukkarie | G01C 21/26 701/22 |
| 2014/0172727 A1* | 6/2014 | Abhyanker | G06Q 50/30 705/307 |
| 2014/0188348 A1 | 7/2014 | Gautama | |

(Continued)

*Primary Examiner* — Behrang Badii
*Assistant Examiner* — Daniel L Greene

(57) ABSTRACT

A system to reduce vehicle resource depletion risk which includes a memory, controller, efficiency module, mobile computing device, and fleet vehicle. The memory includes executable instructions. The controller executes the instructions. The controller communicates with an efficiency module. The efficiency module causes a fleet vehicle to optimally perform a rideshare task. The mobile computing device generates first location data and communicates the first location data to the controller. The fleet vehicle includes a vehicle system and a vehicle controls device and can communicate with the controller. The vehicle system generates second location data. The vehicle controls device commands the fleet vehicle to perform a rideshare task. The instructions enable the controller to: receive the first and second location data; perform the efficiency module to produce an output being partially based on the first and second location data and instructs the vehicle to perform a rideshare task; and communicate the output.

20 Claims, 9 Drawing Sheets

(56) References Cited

U.S. PATENT DOCUMENTS

2016/0014252 A1* 1/2016 Biderman ............... B60L 15/20
                                                    455/420
2016/0311334 A1* 10/2016 Moravick ........... B60L 11/1825
2016/0343032 A1* 11/2016 DeWitt .............. G06Q 30/0261
2016/0364678 A1* 12/2016 Cao ...................... G06Q 10/083

* cited by examiner

SYSTEM AND METHOD TO REDUCE VEHICLE RESOURCE DEPLETION RISK

INTRODUCTION

Fleet management systems employed for taxi services can deploy vehicles made available for a customer trip. As such, when the system has delegated and deployed a vehicle for a customer trip, the vehicle will automatically traverse itself over to the customer location for pickup. Upon arrival and pickup, the vehicle will then taxi the customer to their desired destination, drop the customer off, and then reposition itself for parking or back to a central hub until the next customer trip is delegated. Understandably, this vehicle deployment and taxiing process has potential to deplete significant vehicle resources. It is therefore desirable to provide a system and method to allow deployed fleet vehicles to perform their respective taxiing services while effectively reducing the risk of vehicle resource depletion.

SUMMARY

A system to reduce vehicle resource depletion risk is presented herein. The system includes a memory, controller, efficiency module, mobile computing device, and fleet vehicle. The memory is configured to include one or more executable instructions. The controller is configured to execute the executable instructions. The controller is further configured to communicate with an efficiency module. The efficiency module is configured to enable at least one fleet vehicle to optimally perform a rideshare system task. The mobile computing device is configured to generate first location data. The mobile computing device is further configured to communicate the first location data to the controller. The fleet vehicle includes a vehicle system and a vehicle controls device and is configured to communicate with the controller. The vehicle system is configured to generate second location data. The vehicle controls device is configured to command the fleet vehicle to autonomously perform one or more rideshare system tasks. Moreover, the executable instructions enable the controller to: receive the first location data transmitted from the mobile computing device; receive the second location data transmitted from the fleet vehicle; perform the efficiency module to produce an output, the output being partially based on the first location data and the second location data, the output configured to instruct the vehicle controls device to command the fleet vehicle to optimally perform the one or more rideshare system tasks; and communicate the output to the fleet vehicle.

In certain instances, the optimal performance of the one or more rideshare system tasks may include the fleet vehicle making an autonomous traversal from the second location to the first location so as to retrieve a rideshare system user for the purpose of taxiing the rideshare system user from the first location to a subsequent third location selected by the rideshare system user. In one or more embodiments, the system may include the vehicle controls device being further configured to review and analyze the output and resultantly instruct the fleet vehicle so as to autonomously perform the one or more rideshare system tasks in conformity with the output.

In one or more embodiments, the system may include a plurality of the fleet vehicles each of which includes a vehicle system and a vehicle controls device, each fleet vehicle configured to communicate with the controller. In these embodiments, each vehicle system is configured to generate second location data and each vehicle controls device is configured to command the matching fleet vehicle to autonomously perform one or more rideshare system tasks. Moreover, in these embodiments, the executable instructions further enable the controller to perform the efficiency module to: receive second location data transmitted from each of the plurality of fleet vehicles; and select one fleet vehicle from the plurality of fleet vehicles based, at least in part, on the second location data of the selected fleet vehicle in relation to the first location data.

In certain instances, the executable instructions may further enable the controller to perform the efficiency module to produce mapping data which results in the form of a geosector divided geosurface map that includes one or more geosectors with dynamic content data. In these instances, the executable instructions may further enable the controller to perform the efficiency module so as to calculate the dynamic content data of each geosector and resultantly produce a dynamic status indicator for each geosector. In these instances, the fleet vehicle may further include a power source configured to provide State of Charge information and the efficiency module may calculate the dynamic content data of each geosector based, at least in part, on the State of Charge information.

In certain instances, after the output is reviewed and analyzed via the vehicle controls device, the vehicle controls device may instruct the fleet vehicle to traverse from the second location to the first location in such a manner that corresponds to one or more selected geosectors of the geosurface map, wherein the one or more geosectors are each selected based, at least in part, on their correspondent dynamic status indicator.

A method to reduce vehicle resource depletion risk is also presented herein. The method includes the steps of: providing a memory configured to include one or more executable instructions; providing a controller configured to execute the executable instructions, the controller further configured to communicate with an efficiency module, wherein the efficiency module is configured to enable at least one fleet vehicle to optimally perform a rideshare system task; providing a mobile computing device configured to generate user location data, the mobile computing device configured to communicate the user location data to the controller; providing the fleet vehicle includes a vehicle system and a vehicle controls device, the fleet vehicle configured to communicate with the controller, the vehicle system configured to generate vehicle location data, the vehicle controls device configured to command the fleet vehicle to autonomously traverse from the vehicle location to the user location; receiving (via the controller) the user location data transmitted from the mobile computing device; receiving (via the controller) the vehicle location data transmitted from the fleet vehicle; performing (via the controller) the efficiency module to produce an output, the output being partially based on the user location data and the vehicle location data, the output configured to instruct the vehicle controls device to command the fleet vehicle to optimally perform an autonomous traversal from the vehicle location to the user location; and communicating (via the controller) the output to the fleet vehicle.

In one or more embodiments, the method further includes the steps of: receiving (via the controller) updated vehicle location data transmitted from the fleet vehicle; and performing (via the controller) the efficiency module to produce an updated output, the output being partially based on the user location data and the updated vehicle location data. In one or more embodiments, the method further includes the steps of: receiving (via the vehicle controls device) the output; reviewing and analyzing (via the vehicle controls device) the output; and instructing (via the vehicle controls device) the fleet vehicle to autonomously traverse from the vehicle location to the user location. In one or more embodiments, the method further includes the step of autonomously traversing (via the fleet vehicle) from the vehicle location to the user location.

In certain instances, autonomously traversing from the vehicle location to the user location may include the steps of: retrieving (via the fleet vehicle) a rideshare system user located at the user location; and taxiing (via the fleet vehicle) the rideshare system user to a subsequent destination location selected by the rideshare system user.

In one or more embodiments, the method further includes the steps of: providing a plurality of the fleet vehicles each of which include a vehicle system and a vehicle controls device, each fleet vehicle configured to communicate with the controller, each vehicle system configured to generate vehicle location data, and each vehicle controls device configured to command the matching fleet vehicle to autonomously traverse from its respective vehicle location to the user location; receiving (via the controller) vehicle location data transmitted from each of the plurality of fleet vehicles; and selecting (via the controller) one fleet vehicle from the plurality of fleet vehicles based, at least in part, on the vehicle location data of the selected fleet vehicle in relation to the user location data.

In one or more embodiments, the method further includes the step of: performing (via the controller) the efficiency module to produce mapping data which results in the form of a geosector divided geosurface map that includes one or more geosectors with dynamic content data. In one or more embodiments, the method further includes the step of performing (via the controller) the efficiency module to calculate the dynamic content data of each geosector and resultantly produce a dynamic status indicator for each geosector.

In certain instances, the fleet vehicle may further include a power source configured to provide State of Charge information. In these instances, the efficiency module calculates the dynamic content data of each geosector based, at least in part, on the State of Charge information.

In one or more embodiments, the method further includes the steps of: receiving (via the vehicle controls device) the output; reviewing and analyzing (via the vehicle controls device) the output; instructing (via the vehicle controls device) the fleet vehicle to traverse from the vehicle location to the user location in such a manner that corresponds to one or more selected geosectors of the geosurface map, wherein the one or more geosectors are each selected based, at least in part, on their correspondent dynamic status indicator.

A non-transitory and machine-readable medium having stored thereon executable instructions adapted to reduce vehicle resource depletion risk is also presented herein. When such instructions are provided to a controller and executed thereby, the instructions causes the controller to: perform a destination interface of an efficiency module so as to receive user location data, the user location data being transmitted from a mobile computing device; perform a transit interface of the efficiency module so as to receive vehicle location data, the vehicle location data being transmitted from a fleet vehicle; perform a mapping engine and search engine of the efficiency module so as to generate mapping data in the form of a geosector divided geosurface map, the geosector divided geosurface map includes one or more geosectors with dynamic content data; perform a route-optimization engine of the efficiency module so as to calculate the dynamic content data of each geosector and resultantly produce a dynamic status indicator for each geosector; perform an instructions engine of the efficiency module to produce an output based, at least in part, on the dynamic status indicators of each geosector, the output formatted to instruct the vehicle controls device to command the fleet vehicle to optimally perform an autonomous traversal from the vehicle location to the user location; and communicate the output to the fleet vehicle.

The non-transitory and machine-readable memory may further include the instructions causes the controller to: perform a transit interface of the efficiency module to receive vehicle location data that includes a plurality of vehicle location coordinates, the vehicle location coordinates being transmitted from a plurality of fleet vehicles; and select one fleet vehicle from the plurality of fleet vehicles based, at least in part, on the vehicle location coordinates for the selected fleet vehicle in relation to the user location data.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The following detailed description is merely exemplary in nature and is not intended to limit the application and uses. Furthermore, there is no intention to be bound by any expressed or implied theory presented in the preceding background and brief summary or the following detailed description. As used herein, the term module refers to an application specific integrated circuit (ASIC), an electronic circuit, a processor (shared, dedicated, or group) and memory that executes one or more software or firmware programs or code segments, a combinational logic circuit, and/or other suitable components that provide the described functionality.

Figure 1:
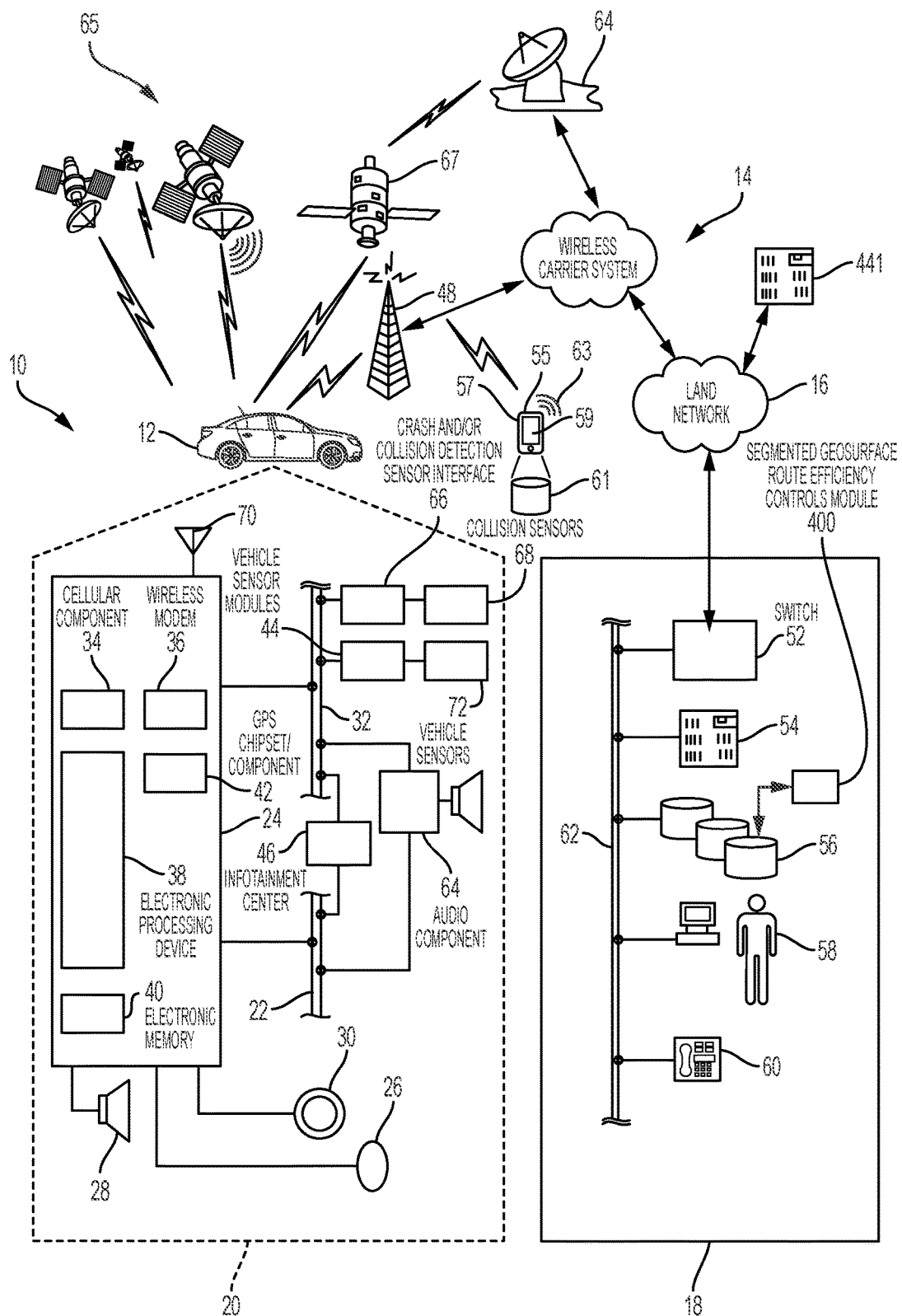
FIG. 1 is a block diagram depicting an exemplary embodiment of a communications system capable of utilizing the system and method disclosed herein.

As shown in FIG. 1, there is shown a non-limiting example of a communication system 10 that may be used together with examples of the system disclosed herein and/or to implement examples of the methods disclosed herein. Communication system 10 generally includes a fleet of vehicles 12, a wireless carrier system 14, a land network 16, and a data center 18 (i.e., the backend). It should be appreciated that the overall architecture, setup and operation, as well as the individual components of the illustrated system are merely exemplary and that differently configured communication systems may also be utilized to implement the examples of the system and/or method disclosed herein. Thus, the following paragraphs, which provide a brief overview of the illustrated communication system 10, are not intended to be limiting.

Each fleet vehicle 12 may be any type of autonomous vehicle (discussed below) such as a motorcycle, car, truck, bicycle, recreational vehicle (RV), boat, plane, etc., and is equipped with suitable hardware and software that enables it to communicate over communication system 10. In certain embodiments, each vehicle 12 may include a power train system with multiple generally known torque-generating devices including, for example, one or more electric motors or traction motors that convert electrical energy into mechanical energy for vehicle propulsion.

Some of the fundamental vehicle hardware 20 for each fleet vehicle is shown generally in FIG. 1 including a telematics unit 24, a microphone 26, speaker 28, and buttons and/or controls 30 connected to telematics unit 24. Operatively coupled to telematics unit 24 is a network connection or vehicle bus 32. Examples of suitable network connections include a controller area network (CAN), a media oriented system transfer (MOST), a local interconnection network (LIN), an Ethernet, dedicated short-range communications channel (DSRC), and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is a communication system which provides a variety of services through its communications with the data center 18, and generally includes an electronic processing device 38, one or more types of electronic memory 40, a cellular chipset/component 34, wireless modem 36, dual mode antenna 70, and navigation unit containing a GPS chipset/component 42 capable of communicating location information via a GPS satellite system 65. GPS component 42 thus receives coordinate signals from a constellation of GPS satellites 65. From these signals, the GPS component 42 can determine vehicle position, which may be used for providing navigation and other position-related services to the vehicle operator. Navigation information can be presented on a display of telematics unit 24 (or other display within the vehicle) or can be presented verbally such as is done when supplying turn-by-turn navigation. The navigation services can be provided using a dedicated in-vehicle navigation module (which can be part of GPS component 42), or some or all navigation services can be done via telematics unit 24, wherein the location coordinate information is sent to a remote location for purposes of providing the vehicle with navigation maps, map annotations, route calculations, and the like.

The telematics unit 24 may provide various services including: turn-by-turn directions and other navigation-related services provided in conjunction with the GPS component 42; airbag deployment notification and other emergency or roadside assistance-related services provided in connection with various crash and/or collision sensor interface modules 66 and collision sensors 68 located throughout the vehicle and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services telematics unit 24 may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), etc. To accomplish this effect, dual mode antenna 70 services the GPS component 42 and the cellular component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and data center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with data center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to telematics unit 30 via the crash and/or collision detection sensor interface 66 regarding the severity of a vehicle collision, such as the angle of impact and the amount of force sustained.

Vehicle sensors 72, connected to various vehicle sensor modules 44 (VSMs) in the form of electronic hardware components located throughout each fleet vehicle and use the sensed input to perform diagnostic, monitoring, control, reporting and/or other functions. Each of the VSMs 44 is preferably connected by vehicle bus 32 to the other VSMs, as well as to the telematics unit 24, and can be programmed to run vehicle system and subsystem diagnostic tests. As examples, one VSM 44 can be an engine control module (ECM) that controls various aspects of engine operation such as fuel ignition and ignition timing. According to one embodiment, the ECM is equipped with on-board diagnostic (OBD) features that provide myriad real-time data, such as that received from various sensors including vehicle emissions sensors, fuel diagnostics sensors, and vehicle oil pressure sensors as well as provide a standardized series of diagnostic trouble codes (DTCs) which allow a technician to rapidly identify and remedy malfunctions within the vehicle. VSM 44 can similarly be a powertrain control module (PCM) that regulates operation of one or more components of the powertrain system. Another VSM 44 can be a body control module (BCM) that monitors and governs various electrical components located throughout the vehicle body like the vehicle's power door locks, air conditioner, tire pressure, lighting system, engine ignition, vehicle seat adjustment and heating, mirrors, and headlights. Furthermore, as can be appreciated by skilled artisans, the above-mentioned VSMs are only examples of some of the modules that may be used the vehicles 12, as numerous others are also possible.

A passive entry passive start (PEPS) module, for instance, is another of the numerous of VSMs and provides passive detection of the absence or presence of a passive physical key or a virtual vehicle key. When the passive physical key approaches, the PEPS module can determine if the passive physical key is authentic as belonging to the vehicle. The PEPS can likewise use authentication information received from data center 18 to determine if a mobile computing device 57 with virtual vehicle key is authorized/authentic to vehicle. If the virtual vehicle key is deemed authentic, the PEPS can send a command to BCM 44 permitting access to its vehicle. It should be understood that the PEPS may be an electronic hardware component connected to the vehicle bus 32 or, in an alternative embodiment, may be one or more software modules (code segments) uploaded to electronic memory 40.

Wireless carrier system 14 may be a cellular telephone system or any other suitable wireless system that transmits signals between the vehicle hardware 20 and land network 16. According to an example, wireless carrier system 14 includes one or more cell towers 48.

Land network 16 can be a conventional land-based telecommunications network connected to one or more landline telephones, and that connects wireless carrier system 14 to data center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

As revealed above, one of the networked devices that can directly or indirectly communicate with the telematics unit 24 is a mobile computing device 57, such as (but not limited to) a smart phone, personal laptop computer or tablet computer having two-way communication capabilities, a wearable computer such as (but not limited to) a smart watch or glasses, or any suitable combinations thereof. The mobile computing device 57 can include computer processing capability, a transceiver 53 capable of communicating with remote locations (e.g., data center 18), digital camera 55, user interface 59, and/or GPS module 63 capable of receiving GPS satellite signals and generating GPS coordinates based on those signals. User interface 59 may be embodied as a touch-screen graphical interface capable of user inter-action as well as exhibiting information. Digital camera 55 may include the ability to generate bitmapped data representations of captured tangible-object images through generally known operations. Examples of the mobile computing device 57 include the iPhone™ and Apple Watch™ each being manufactured by Apple, Inc. and the Droid™ smart phone manufactured by Motorola, Inc. as well as others.

Mobile device 57 may be used inside or outside of a vehicle, and may be coupled to the vehicle by wire or wirelessly. Mobile device 57 may also be configured to provide services according to a subscription agreement with a third-party facility or wireless/telephone service provider. It should be appreciated that various service providers may utilize the wireless carrier system 14 and that the service provider of telematics unit 30 may not necessarily be the same as the service provider of mobile device 57.

When using a short-range wireless connection (SRWC) protocol (e.g., Bluetooth Low Energy, Wi-Fi, etc.), mobile computing device 57 and telematics unit 24 may pair with each other (or link to one another) on a case-by-case basis and while within a wireless range; SRWC pairing is known to skilled artisans. The SRWC protocol may be an aspect of telematics unit 24 or may be part of one or more independent VSMs 44 such as the PEPS and/or BCM 44. Once SRWC is established, the devices may be considered bonded (i.e., they may recognize one another and/or connect automatically when they are in a predetermined proximity or range of one other. In other words—they may become, at least temporarily, network participants).

This unique pairing, for example, allows mobile computing device 57 to act as the virtual key fob briefly mentioned above. To illustrate for this to happen—upon receiving a request, data center 18 will generate an encrypted virtual vehicle key to permit vehicle access via mobile computing device 57. Data center 18 will then transmit aspects this encrypted virtual vehicle key information to both mobile computing device 57 and the PEPS module 44 via telematics unit 24. After paring has been established, mobile computing device 57 will send its virtual vehicle key aspect to telematics unit 24 for recognition in light of its stored corresponding virtual key aspect and in turn the PEPS may establish mobile computing device 57 as the key fob for the vehicle. Data center 18 may also transmit one or more time parameters with the encrypted virtual vehicle key information so as to temporarily establish the virtual vehicle key of mobile device 57.

Data center 18 is designed to provide the vehicle hardware 20 with a number of different system backend functions and, according to the example shown here, generally includes one or more switches 52, servers 54, databases 56, advisors 58 as well as a variety of other telecommunication/computer equipment 60. These various data center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. Although the illustrated example has been described as it would be used in conjunction with a manned data center 18, it will be appreciated that the data center 18 can be any central or remote facility, manned or unmanned, mobile or fixed, to or from which it is desirable to exchange voice and data.

Server 54 can incorporate a data controller which essentially controls its operations. Server 54 may control data information as well as act as a transceiver to send and/or receive the data information (i.e., data transmissions) from one or more of the databases 54, telematics unit 24, and mobile computing device 57, remote database 441. The controller is moreover capable of reading executable instructions stored in a non-transitory machine readable medium and may include one or more from among a processor, microprocessor, central processing unit (CPU), graphics processor, Application Specific Integrated Circuits (ASICs), Field-Programmable Gate Arrays (FPGAs), state machines, and a combination of hardware, software, and firmware components.

Remote database 441 can be one of a number of computers accessible via a private or public network such as the Internet (e.g., a server system). Each such computer 441 can be used for one or more purposes, such as storing one or more dynamic content providers which can provide dynamic content for map data.

Database 56 could be designed to store numerous application program interface (API) suites. Moreover, in certain instances, these API suites may be accessible to the system user, data center 18, or one or more third parties. As examples, one API suite can be a rideshare services suite that incorporates numerous rideshare system records (i.e., vehicle reservation information) each having information related to the vehicles in fleet 12 such as, but not limited to, rideshare vehicle records (e.g., vehicle VSM information), information related to the user such as, but not limited to, reservation account records (e.g., vehicle comfort settings information, telematics unit settings, or vehicle make-model preferences), information related to organizing vehicle reservations such as, but not limited to, reservation profile records (e.g., reservation calendar information, vehicle assignment information, third party contact information, etc.), and information related to fleet management (e.g., fleet vehicle feedback data, localization and mapping module data, path planning module feedback data, etc.), or any other pertinent rideshare system information. The records can moreover be copied, organized, and/or stored in a tabular form to allow for continuous, real-time updates. The records can additionally collaborate with a reservation account (discussed below) for support of, for example, reservation management.

Another example of an API suite is a route efficiency controls module that provides a geosurface map and produces route instructions that enable a fleet vehicle to optimally perform tasks. The geosurface map contains identifiable static and dynamic resources in a multitude of defined grid geosectors and can use these resources to provide a task-performance status for each geosector (discussed below). The route instructions cause the fleet vehicle, based upon the geosurface map, to take an optimally efficient route to arrive at a designated location (discussed below).

The user of mobile computing device 57 may create their own personalized vehicle reservation account to be stored in mobile memory 61 and which may have access to the rideshare records at the backend. The user may perform tasks to create this account through a variety of frontend devices such as, for example, through a remote computer and mobile computing device 57. This reservation account may be uploaded to or accessible on server 54 (i.e., to support backend functions). Data center 20 may also access one or more additional remote servers and/or remote databases (e.g., Department of Motor Vehicles, weather databases, traffic databases, etc.) to receive information in support of the reservation account as well as a particular reservation and one or more rideshare system records.

The reservation account may include validating data to verify and/or validate that future login attempts are secure (e.g., granting access only to the user). The validating data may include an account username and account password as well as user information (e.g., driver's license information), mobile computing device information such as, for example, the unique mobile device identifier (i.e., serial number). The user account may additionally store a variety of user preferences.

The user of mobile device 57 may visit an online software application store or web-service and download the reservation account as a software module therefrom. The reservation account may moreover include one or more prompts to instruct the user to provide information (e.g., validating data) to support account creation.

Reservation account may also provide one or more prompts to assist a rideshare system user in reserving a fleet vehicle by operatively accessing and communicating with the backend rideshare system records (for the purposes of obtaining transportation to certain destinations). Once a reservation is made, mobile computing device 57 will transmit this reservation information to one or more of the rideshare records for updates thereto. At the backend, server 54 will collaborate with database 56 and one or more of the rideshare system records to establish a subset of the fleet available for reservation. To illustrate, for example, server 54 can manage the use of a fleet of twenty (20) vehicles in a particular geographic location and determine that five (5)

of those vehicles are available to carryout the requested reservation. Server 54 will then select one of those fleet vehicles using a vehicle identifier and assign that identifier to the reservation account and corresponding rideshare records for use during the requested reservation. Server 54 then communicates provided pickup coordinates to the selected fleet vehicle via its telematics unit 24 so the vehicle can direct itself to the pickup location. As vehicles are requested and used, server 54 can determine the identities of the vehicles currently in use and monitor various aspects of the other fleet vehicles so as to understand which vehicles are available at any particular time. This monitoring process may thus be conducted through review of one or more rideshare records.

Electric Vehicle Aspects

Figure 2:
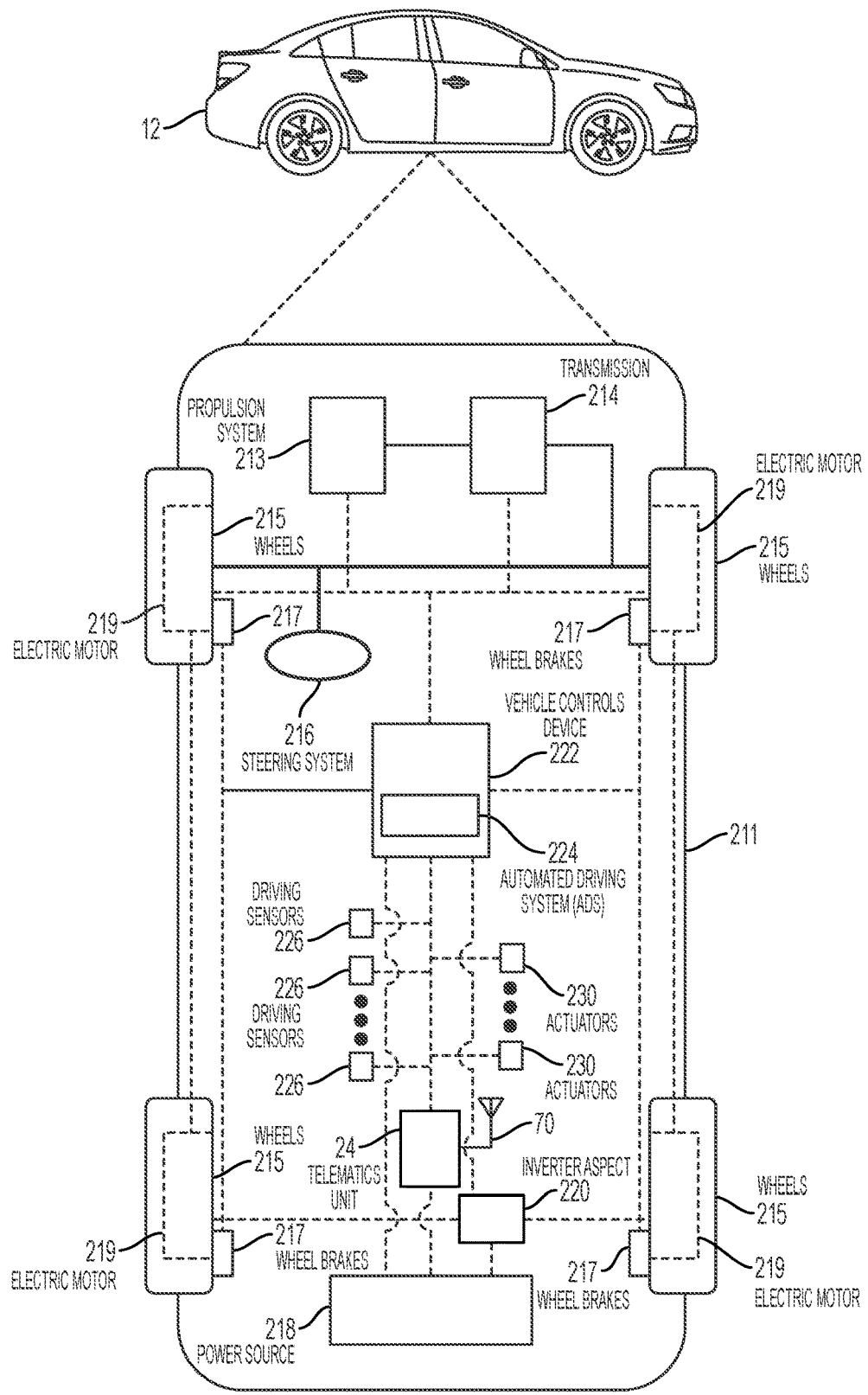
FIG. 2 is a schematic diagram of an autonomously controlled electric vehicle, according to an embodiment of the communications system of FIG. 1.

With reference to FIG. 2, each fleet vehicle 12 is an electric vehicle (EV) that generally includes vehicle wheels 215 which rotatably support a vehicle body 211. Fleet vehicle 12 further includes a propulsion system 213 with at least one electric motor 219. In one embodiment, an electric motor 219 is operatively connected to each of the vehicle wheels 215 to transmit torque thereto, and thereby propel the fleet vehicle 12. These motors may moreover be directly or indirectly connected to their corresponding wheel via a transmission 214 (shown as a direct connection configuration).

Propulsion system 213 can also include a power source 218 embodied as a battery for the purpose of providing direct-current (DC) electricity to power each of the motors, as well as other vehicle systems. Each motor may be a permanent-magnet motor that uses alternating current (AC) electricity. Consequently, propulsion system 213 can include an inverter aspect 220 operatively connected to power source 218 output so as to allow the DC current to be converted into AC current before being supplied to the motors. Propulsion system 213 may additionally be connected to a vehicle controls device 222, discussed below, to regulate the amount of transmitted energy from power source 218 so as to effectively control the torque output from each motor 219. Propulsion system 213 may further include an input component, which in some embodiments contemplated within the scope of the present disclosure can be operable by a human (i.e., a selectively depressible foot pedal), to provide for an input of a desired torque output. Propulsion system 213 may moreover be connected to vehicle bus 32 to communicate with one or more VSMs 44 (not shown). For example, OBD 44 may provide State of Charge (SoC) information for power source 218 based on information the VSM receives from one or more power reading sensors.

While depicted as a single unit for illustrative purposes, vehicle controls device 222 may additionally include one or more other controllers, collectively referred to as a "controls device" or "vehicle controls device." Controls device 222 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controls device 222 in controlling the vehicle.

Autonomous Vehicle Aspects

In addition to the fleet vehicle aspects discussed above, transmission 214 may be installed to transmit power from propulsion system 213 to vehicle wheels 215 according to selectable speed ratios. According to various embodiments, transmission 214 may include a step-ratio automatic transmission, a continuously-variable transmission, or other appropriate transmission. Fleet vehicle 12 additionally includes wheel brakes 217 configured to provide braking torque to the vehicle wheels 215. The wheel brakes 217 may, in various embodiments, include friction brakes, a regenerative braking system such as an electric machine, and/or other appropriate braking systems. It should be understood transmission 214 does not necessarily need to be installed for propulsion system 213 to propel fleet vehicle 12.

Each fleet vehicle 12 additionally includes a steering system 216. While depicted as including a steering wheel for illustrative purposes, in some contemplated embodiments, the steering system 16 may not include a steering wheel. Telematics unit 24 is additionally configured to wirelessly communicate with other vehicles ("V2V") and/or infrastructure ("V2I") and/or pedestrians ("V2P"). These communications may collectively be referred to as a vehicle-to-entity communication ("V2X"). In an exemplary embodiment, this communication system communicates via at least one dedicated short-range communications (DSRC) channel. DSRC channels refer to one-way or two-way short-range to medium-range wireless communication channels specifically designed for automotive use and a corresponding set of protocols and standards.

The propulsion system 213 (explained above), transmission 214, steering system 216, and wheel brakes 217 are in communication with or under controls device 222. Vehicle controls device 222 includes an automated driving system (ADS) 224 for automatically controlling various actuators in the vehicle. In an exemplary embodiment, ADS 224 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 224 is configured to communicate automated driving information with and control propulsion system 213, transmission 214, motors 219, steering system 216, and wheel brakes 217 to control vehicle acceleration, steering, and braking, respectively, without human intervention via a plurality of actuators 30 in response to inputs from a plurality of driving sensors 226, which may include GPS, RADAR, LIDAR, optical cameras, thermal cameras, ultrasonic sensors, and/or additional sensors as appropriate.

Figure 3:
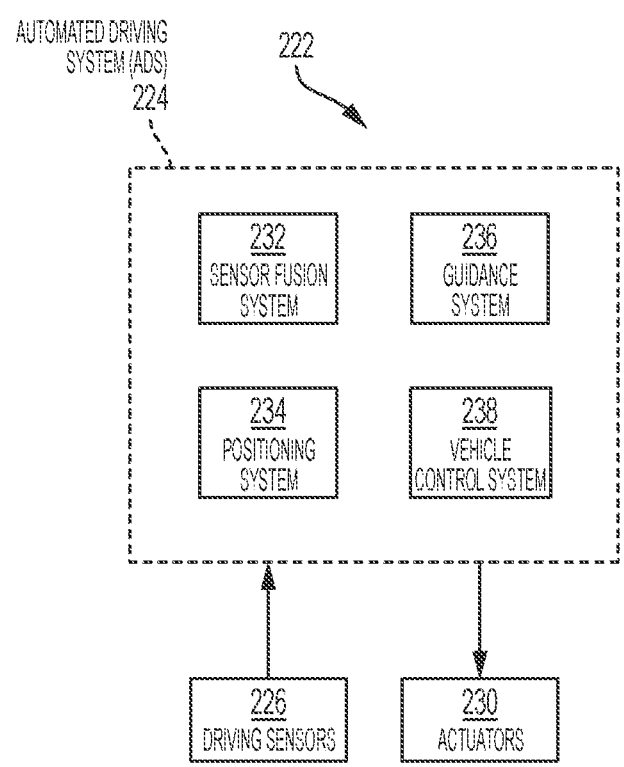
FIG. 3 is a schematic block diagram of an exemplary automated driving system (ADS) for the vehicle of FIG. 2.

In various embodiments, the instructions of the ADS 224 may be organized by function or system. For example, as shown in FIG. 3, ADS 224 can include a sensor fusion system 232 (computer vision system), a positioning system 234, a guidance system 236, and a vehicle control system 238. As can be appreciated, in various embodiments, the instructions may be organized into any number of systems (e.g., combined, further partitioned, etc.) as the disclosure is not limited to the present examples.

In various embodiments, the sensor fusion system 232 synthesizes and processes sensor data and predicts the presence, location, classification, and/or path of objects and features of the environment of the vehicle 12. In various embodiments, the sensor fusion system 232 can incorporate information from multiple sensors, including but not limited to cameras, lidars, radars, and/or any number of other types of sensors. In one or more exemplary embodiments described herein, the sensor fusion system 232 supports or otherwise performs the ground reference determination processes and correlates image data to lidar point cloud data, the vehicle reference frame, or some other reference coordinate frame using calibrated conversion parameter values associated with the pairing of the respective camera and reference frame to relate lidar points to pixel locations, assign depths to the image data, identify objects in one or more of the image data and the lidar data, or otherwise synthesize associated image data and lidar data. In other words, the sensor output from the sensor fusion system 232 provided to the vehicle control system 238 (e.g., indicia of detected objects and/or their locations relative to the vehicle 10) reflects or is otherwise influenced by the calibrations and associations between camera images, lidar point cloud data, and the like.

The positioning system 234 processes sensor data along with other data to determine a position (e.g., a local position relative to a map, an exact position relative to lane of a road, vehicle heading, velocity, etc.) of the vehicle 12 relative to the environment. The guidance system 236 processes sensor data along with other data to determine a path for the vehicle 12 to follow (i.e., path planning data). The vehicle control system 238 generates control signals for controlling the vehicle 12 according to the determined path.

In various embodiments, the vehicle controls device 222 implements machine learning techniques to assist the functionality of the vehicle controls device 222, such as feature detection/classification, obstruction mitigation, route traversal, mapping, sensor integration, ground-truth determination, and the like.

The output of vehicle controls device 222 is communicated to actuators 230. In an exemplary embodiment, the actuators 230 include a steering control, a shifter control, a throttle control, and a brake control. The steering control may, for example, control a steering system 216 as illustrated in FIG. 2. The shifter control may, for example, control a transmission 214 as illustrated in FIG. 2. The throttle control may, for example, control a propulsion system 213 as illustrated in FIG. 2. The brake control may, for example, control wheel brakes 217 as illustrated in FIG. 2.

Geosurface Route Efficiency Controls Module

Figure 4:
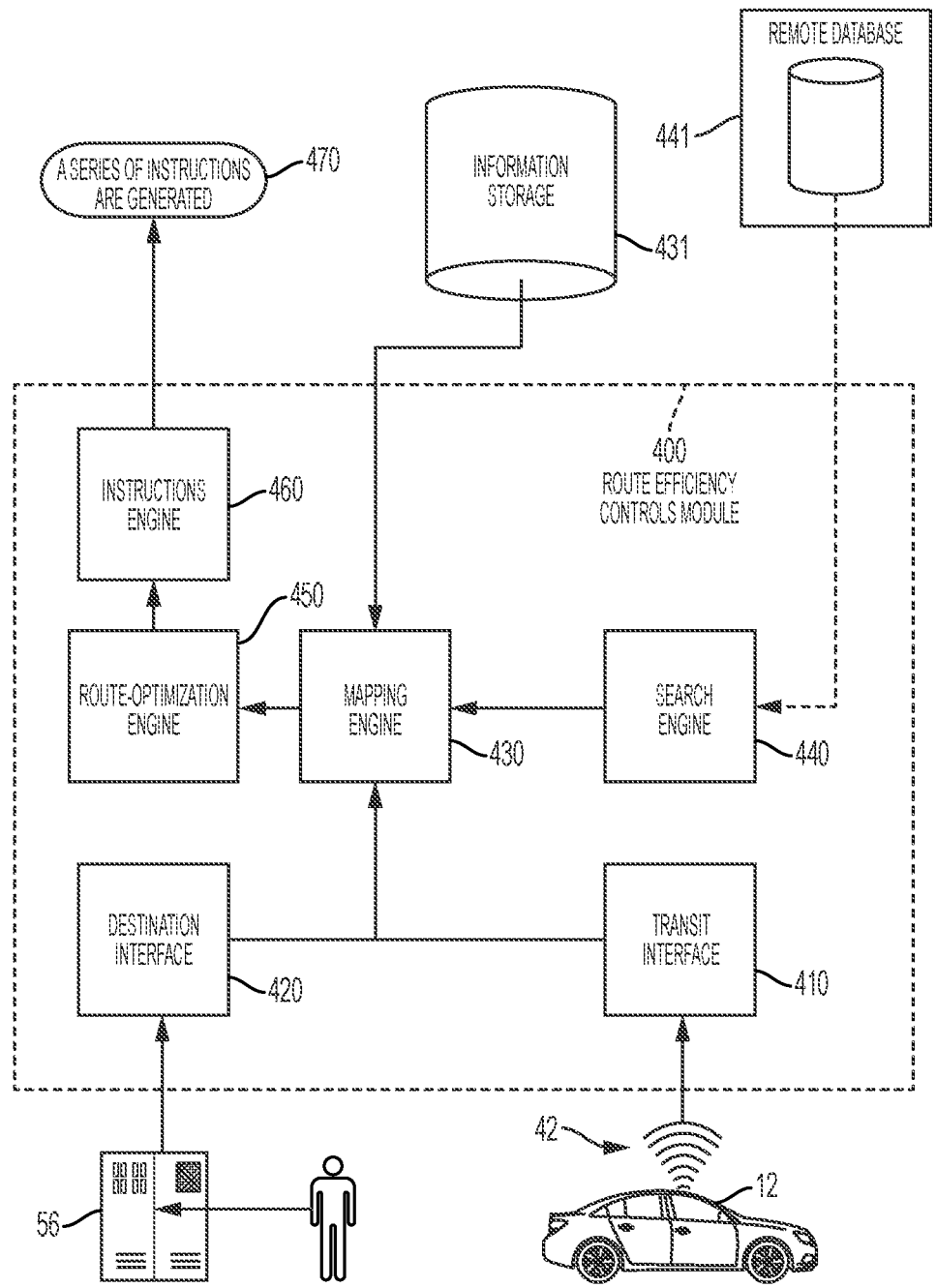
FIG. 4 is a schematic representation of an exemplary segmented geosurface route efficiency controls module (efficiency module) according to an aspect of the system and method presented herein.

FIG. 4 is a block diagram schematically showing a detailed exemplary embodiment of the segmented geosurface route efficiency controls module 400 (otherwise known as "efficiency module") as including certain functional blocks, which do not actually correspond to any physical separation of the functions, as these blocks correspond to software modules (code segments). Efficiency module 400 may be performed to instruct the one or more delegated fleet vehicles 12 to each optimally perform at least one rideshare system task. An exemplary rideshare system task may be considered one in which the delegated fleet vehicle arrives at a first specified destination (user location) so as to retrieve a rideshare system user for the purpose of taxiing that user from the first specified destination to a subsequent second specified destination selected by the rideshare system user (destination location). As follows, an optimal performance would be one which allows the delegated fleet vehicle to complete the rideshare system task while depleting less vehicle resources than the task being performed in an alternative manner.

Route efficiency controls module 400 includes multiple distinct components—a transit interface 410, destination interface 420, mapping engine 430, search engine 440, route-optimization engine 450, and instructions engine 460. These components can combine to provide an optimal route from a staring location (figurative point A) to an ending location (figurative point B) of one or more delegated transportation fleet vehicles 12.

Efficiency module 400 can receive, via the transit interface 410, GPS data from the telematics unit 24 of a delegated fleet vehicle 12 as vehicle location coordinates. This GPS data is provided from GPS component 42 and corresponds to the vehicle's position and can be determined at different instances in time. For example, at time t=T1, the fleet vehicle can be at particular location coordinates (e.g., being identified by a latitude and a longitude). Correspondingly, telematics unit 24 will provide server 54 with GPS data that includes a latitude and longitude at time t=T1, as well as a time stamp of the GPS data transmission. If fleet vehicle 12 is transient, at time t=T2, the fleet vehicle will be at different location coordinates. As a result, updated GPS data and time stamp (t=T2) can also be provided to efficiency module 400. In this manner, GPS component 42 can periodically take updated GPS data measurements of the current status or position of its fleet vehicle (e.g., every three/four seconds), and telematics unit 24 will subsequently provide the updated GPS data to server 54. In another example, the GPS component 42 can provide GPS data after taking new or updated GPS measurements or when such measurements become available.

Efficiency module 400 can receive, via the destination interface 420, endpoint coordinates for a delegated fleet vehicle 12. The endpoint coordinates correspond to the user's provided position (e.g., being identified by a latitude and a longitude). For example, a user will provide their user location to server 54 via mobile computing device 57. Such coordinates may be provided via one or more prompts of the reservation account; such coordinates may alternatively be provided via GPS module 63 of mobile computing device 57.

On behalf of efficiency module 400, mapping engine 430 generates a digital geosurface map of those geographic locations in an area surrounding the GPS data coordinates of fleet vehicle 12 and the endpoint coordinates (i.e., a route). For example, in response to a request to provide a map of a given route, mapping engine 430 retrieves the required information from information storage 431, and then filters and formats the map data in a suitable form. Conversely, search engine 440 receives and serves efficiency module 400 to locate a certain geographical features for the map such as, but not limited to, a city plan, streets, parking lots, vehicle charge units, and building addresses.

Efficiency module 400 may correspondingly use data from one or more remote databases 441 to support production of the map data. For example, search engine 440 may access a third-party geocode database 441 in order to determine the geosectors (map grid sectors) of given regions as well as streets, parking lots, vehicle charge stations, and other geographical features in each geosector. Search engine 440 may also access various dynamic content providers 441 (e.g., traffic data feeds, weather data feeds, media outlets, municipalities, etc.) each of which provide dynamic content data for each of the many map geosectors. Efficiency module 400 may additionally collaborate with server 54 to gather data from the rideshare system records (e.g., SLAM feedback data). This remote database 441 information may also be gathered periodically or randomly to support updates to the map data.

Route-optimization engine 450 can determine the most optimal path of travel for the delegated fleet vehicle, from the vehicle position to the designated endpoint coordinates. In doing so, optimization engine 450 aggregates the dynamic content data provided for each map geosector so as to associate the geosector with a corresponding status (discussed below). As such, server 54 will review the dynamic content data per each established geosector, assign a score to various portions of dynamic content data, aggregate the assigned scores, and, for example, use a statistical/probabilistic technique to arrive at a geosector status. Based on these calculated statuses, optimization engine 450 will provide a status indicator to each geosector (discussed below).

In addition, instructions engine 460 will compile the pertinent map data (e.g., road data) for the most applicable route based on the geosectors statuses, so as to generate a series of instructions 470 for one or more fleet vehicles to arrive at the designated endpoint coordinates. As a result, instructions 470 will provide that the respective one or more delegated fleet vehicles 12 can autonomously operate themselves to arrive at designated endpoint coordinates in a manner that should deplete less vehicle resources than taking one or more alternative routes. For instance, instructions 470 may allow the delegated fleet vehicle 12 to arrive at designated endpoint coordinates (as well as additionally remain able to subsequently arrive at least at a vehicle charge station) without having power source 218 drop below a safety baseline (i.e., falling to a dangerously low SoC level).

Instructions 470 are then provided from efficiency module 400 and communicated to one or more selected fleet vehicles indirectly via server 54. Instructions 470 are moreover in a format suitable to be understood by path planning module 350. It should be understood that instructions 470 may be sent to server 54 upon a request from the server 54 or vehicle 12; instructions 470 may conversely be sent to server 54 or vehicle 12 automatically upon their genesis or when one or more updates occur thereto.

Peripherally, upon being received at fleet vehicle 12, vehicle controls device 222 may review and analyze the suitably formatted instructions 470. Vehicle controls device 222 may then compile the instructions 470 to cause fleet vehicle 12 to optimally perform one or more ride share system tasks (i.e., autonomously traversing from the vehicle location to the user location, retrieve the user, and then taxi the user to a subsequent user-selected destination).

Geosurface Map

Figure 5:
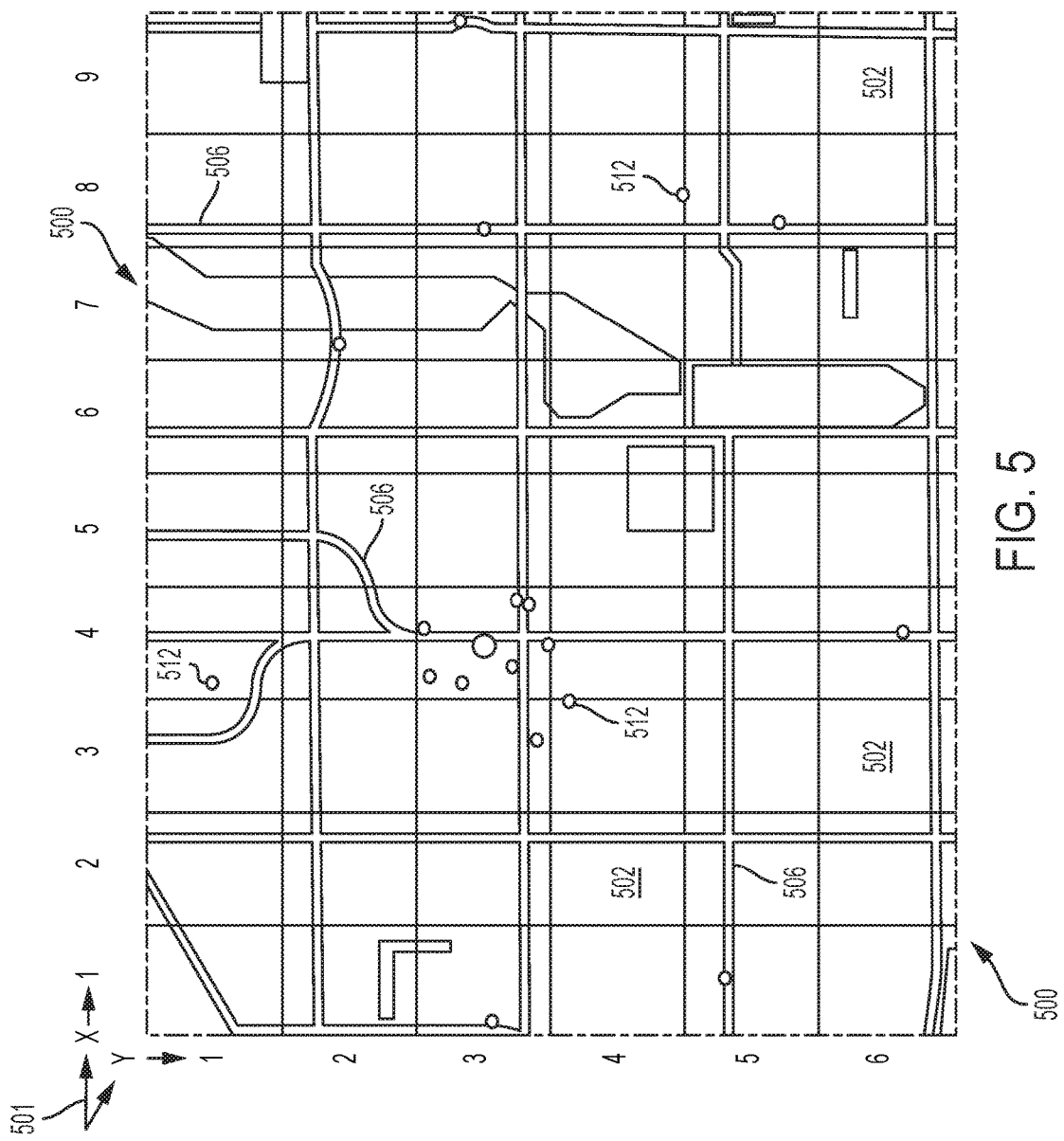
FIG. 5 represents broad aspects of an exemplary map illustrating a performance of the efficiency module of FIG. 4.

FIG. 5 shows the mapping engine 430 generated mapping data in the form of a geosector divided geosurface map 500 for an entire region. As shown, map 500 includes a grid with multiple geosectors 502 each of which having their own (x, y) ordered pair coordinate designators 501 (i.e., row, col.). It should be understood that these geosectors do not necessarily need to be uniform nor do they need to consist of a square shape.

Figure 6:
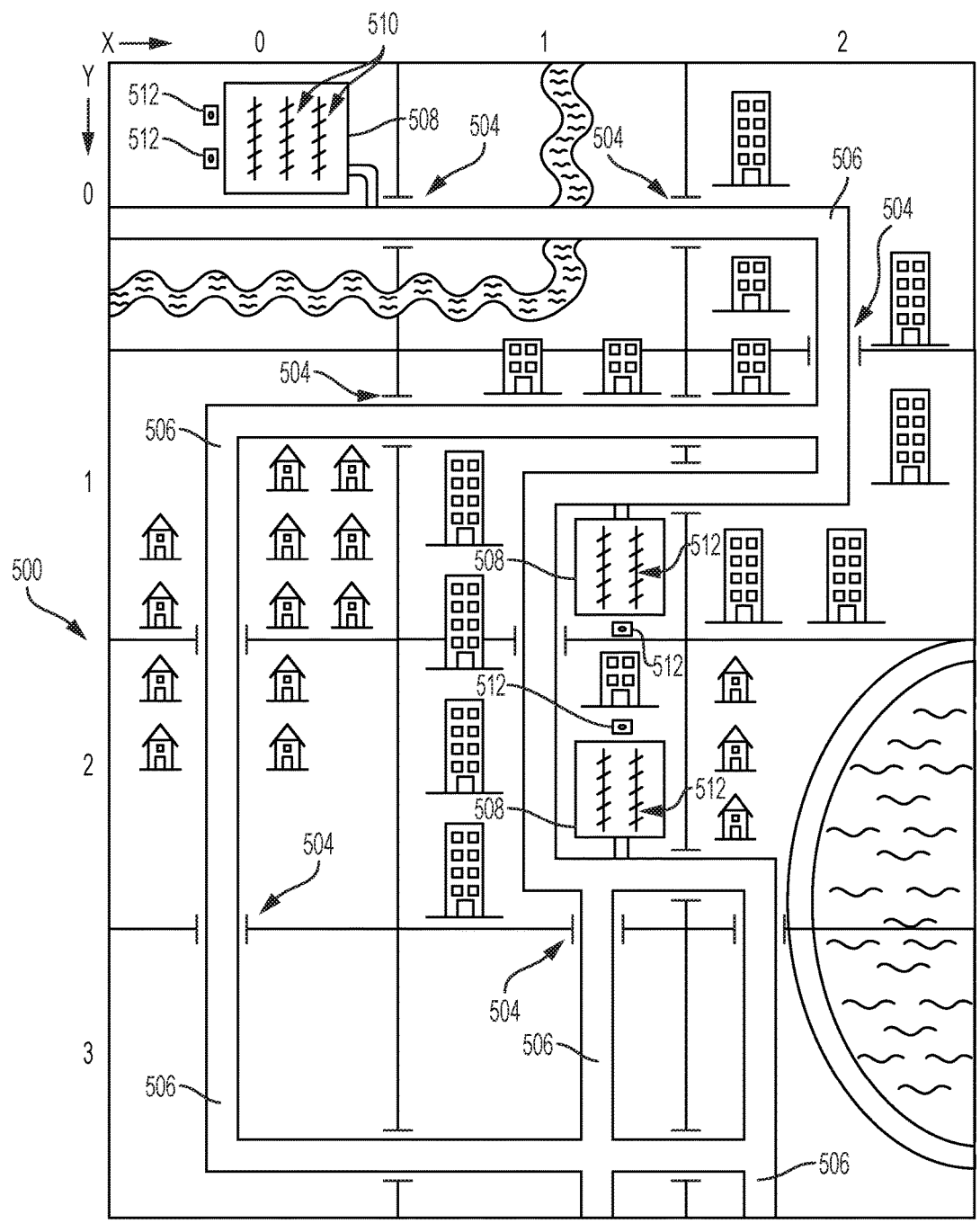
FIG. 6 represents technical aspects of another exemplary map illustrating a performance of the efficiency module of FIG. 4.
Figure 7:
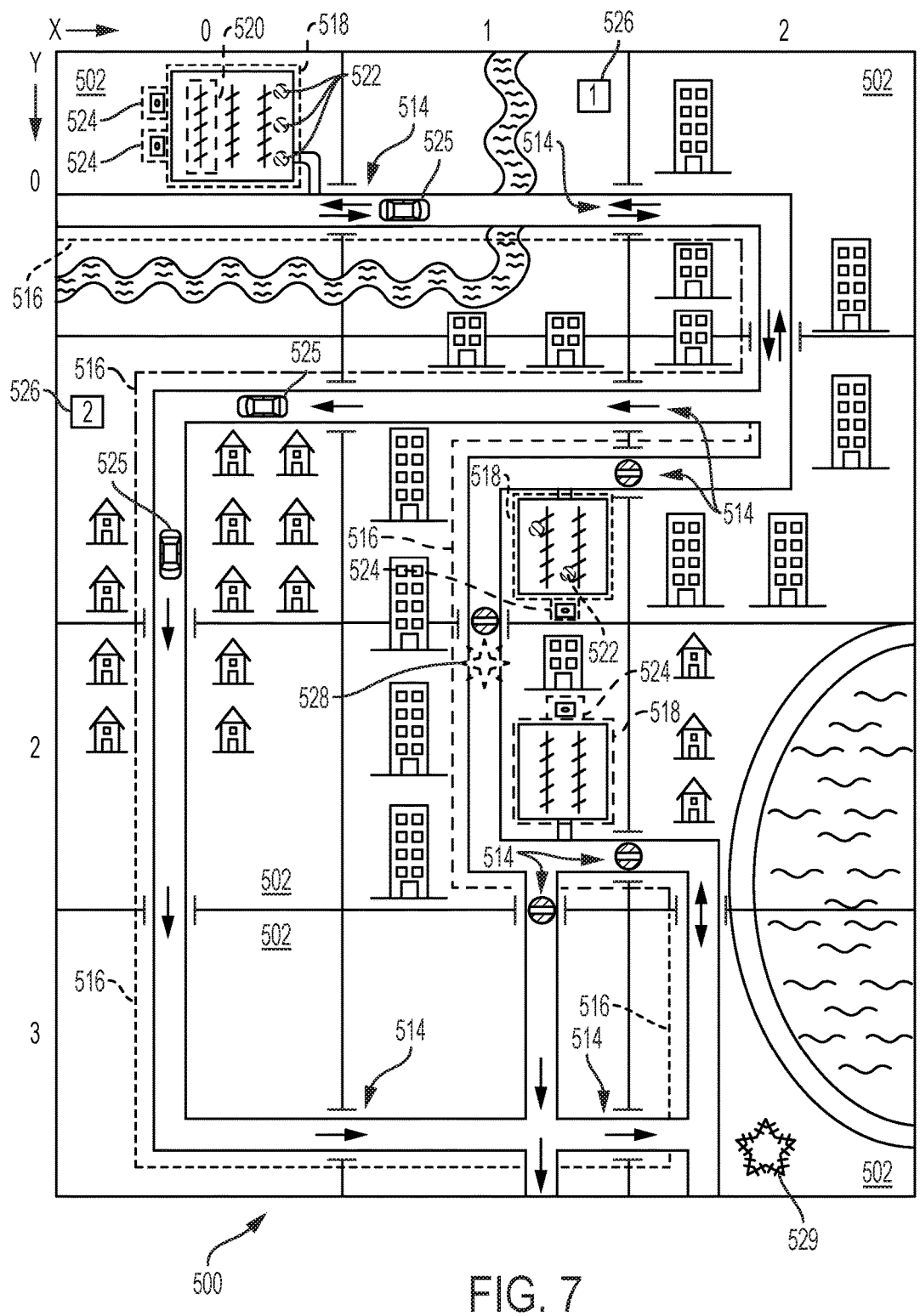
FIG. 7 represents one or more additional technical aspects of the map of FIG. 6.

Each geosector 502 itself contains identifiable route resources provided from search engine 440. For example, as shown in FIG. 6, these resources may be static content data attributes in the form of, for example, route ingress/egress points 504, road segments 506, parking lots 508, parking spaces 510, and EV charge stations 512. As shown in FIG. 7, these resources may alternatively be dynamic content data attributes in the form of, for example, route ingress/egress congestion indicators 514, traffic congestion indicators 516, parking lot availability indicators 518, parking space availability indicators 520, vehicle availability indicators 522, charge station availability indicators 524, vehicle location indicators 525, vehicle traversal statistics 526 (i.e., quantity of fleet vehicles within a particular geosector 502), road obstruction indicators 528, destination indicators 529.

For example, the dynamic attributes for the geosector 502 located at (0, 0) may establish a parking lot availability indicator 518 which reflects an available parking lot, a parking space availability indicator 520 which reflects a row of available parking spaces, charge station availability indicators 524 reflected as being available, multiple available vehicles 522, a route ingress/egress congestion indicator 514 which reflects vehicles are free to enter and exit the geosector 502, and traffic congestion indicators 516 which reflect relatively low traffic on the roads. Based on the static attributes, moreover, the dynamic attributes for the geosector 502 located at (0, 1) may simply establish traffic congestion indicators 516 which reflect light traffic on the roads of this geosector (indicated as two vehicles 526). Whereas, the dynamic attributes for the geosector 502 located at (2, 1) may establish a parking lot availability indicator 518 which reflects a closed parking lot (unavailable), thus an unavailable charge station 524 and no available vehicles 522, one or more route ingress/egress congestion indicators 514 which reflect vehicles cannot enter the geosector 502 in one or more locations (e.g., due to road obstruction 528), and traffic congestion indicators 516 which reflect that traffic on the roads of this geosector is at a standstill (e.g., due to road obstruction 528).

Figure 8:
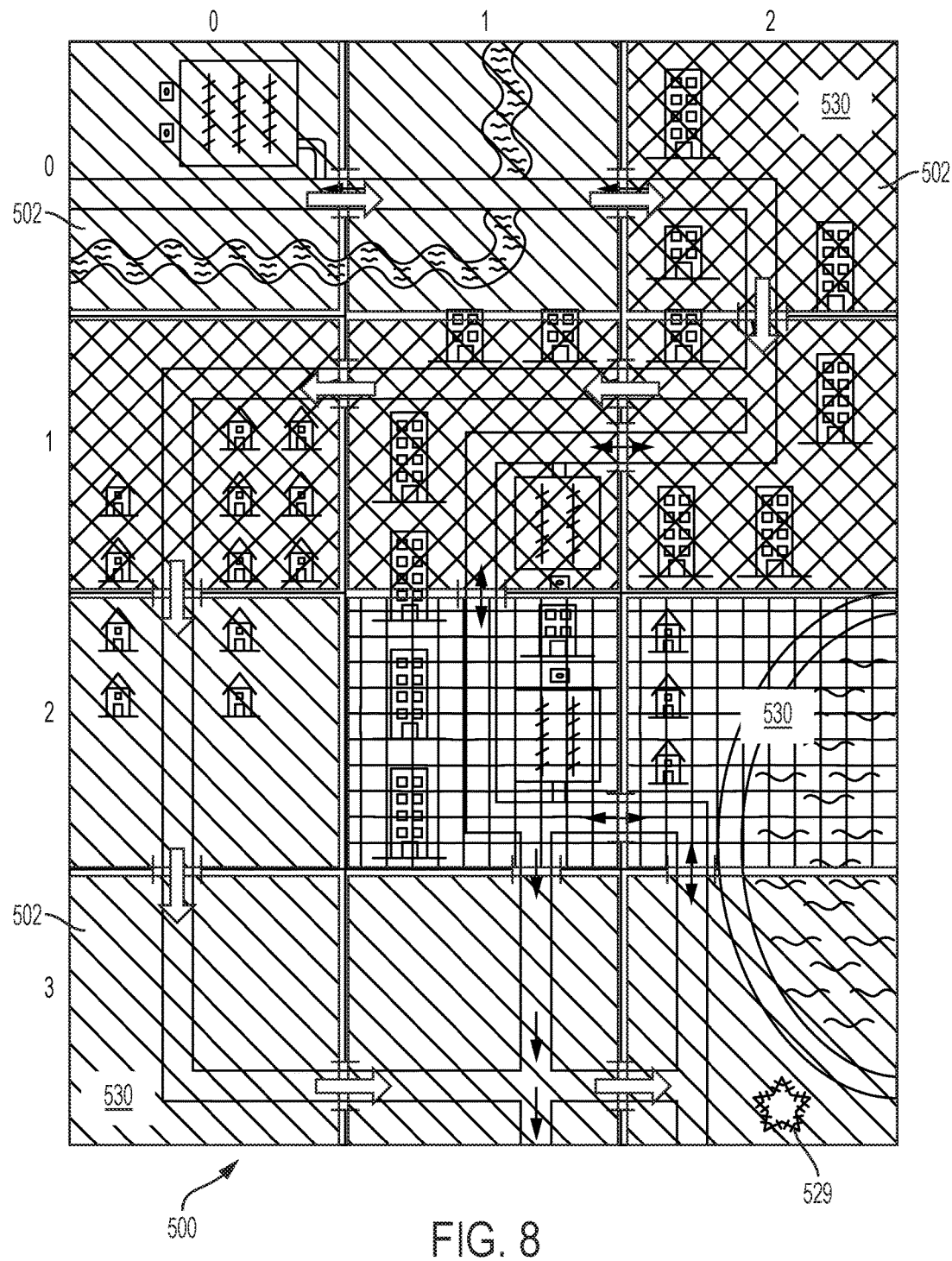
FIG. 8 represents one or more additional technical aspects of the map of FIGS. 6.

As shown in FIG. 8, route-optimization engine 450 can, in one embodiment, apply a statistical/probabilistic technique to such dynamic attributes for each geosector 502 so as to successively arrive at a conforming dynamic status indicator 530. These status indicators 530 may, for example, be indicated by a color, as explained above, and can be used to determine the most applicable route for a fleet vehicle based on vehicle resources. For example, a status indicator 530 designated as "green" and may be deemed to deplete minimal vehicle resources when a delegated fleet vehicle traverses through the matching geosector. Consequently, a status indicator designated as "yellow" and may be deemed to deplete a safe amount of vehicle resources and a fleet vehicle should be instructed to traverse such a geosector only when traversing a green geosector is not currently an option. However, a status indicator designated as "red" may be deemed to deplete a maximum amount of vehicle resources and a fleet vehicle should be instructed to avoid traversing these geosectors if at all possible. It should be understood dynamic attributes may additionally be aggregated periodically or randomly to update the status indicators 530 for one or more geosectors 502.

To arrive at the above status indicators 530, each dynamic attribute itself may be provided a weighted score. For example, due to high traffic, one geosector's route ingress/ egress congestion indicators 514 may be factored to have a score of 0.05; whereas, the route ingress/egress congestion indicators 514 for a different, far less congested, geosector 530 may be factored to have a score of 0.20. Furthermore, one geosector's route traffic congestion indicators 516 may be factored to have a score of 0.08; whereas, the traffic congestion indicators 516 for a different, less congested, geosector 530 may be factored to have a score of 0.15. Additionally, parking space availability indicators 520 for one geosector 530 may be factored to have a score of 0.01 versus a score of 0.02 for a geosector 530 with more available parking.

The dynamic attributes per each geosector 502 may moreover be aggregated to provide the geosector an overall score. A status indicator designated as "green" may, for example, require a high score of somewhere between the parameters 0.67 and 1.0 (e.g., vehicles are traversing the geosector's road segments at or near posted speed limits, there is an abundance of available parking spaces and charging stations, etc.). A status indicator designated as "green" may also, for example, indicate that a plurality of fleet vehicles are available in the geosector 53, reducing the traversal burdens on a delegated fleet vehicle by allowing vehicle chaining within the geosector 502. A status indicator designated as "yellow" may require a score of somewhere between 0.34 and 0.66 (i.e., moderate traffic flow congestion, a limited amount of available charging stations, limited amount of available parking spaces, etc.). Lastly, a status indicator designated as "red" may require a low score of somewhere between 0.00 and 0.33 (i.e., there is significant road congestion and traffic flow stoppage, no available charging stations, no parking locations available, etc.).

The SoC information may also be factored to shift the parameters for the geosector scores to support accuracy. For example, if the SoC information indicates that power source 218 has approximately 90% of its charge remaining, then a "green" status may require a score between the parameters 0.55 and 1.0, a "yellow" status may require between 0.20 and 0.55, and a "red" status may be below 0.20. However, if the SoC information indicates that power source 218 has approximately 65% of its charge remaining, then a "green" status may require a score between the parameters 0.75 and 1.0 a "yellow" status may require between 0.45 and 0.75, and a "red" status may be below 0.45.

Based on the dynamic attributes of the example shown in FIG. 8, sections 502: (0, 0), (0, 1), (2, 0), (3, 0), (3, 1), and (3, 2) can be designated as "green" status, sections 502: (0, 2), (1, 0), (1, 1), and (1, 2) can be designated as "yellow" status, and geosectors 502: (2, 1) and (2, 2) can be designated as "red" status. From these results, efficiency module 76 would instruct a fleet vehicle to traverse the following route: (0,0)→(0,1)→(0,2)→(1,2)→(1,1)→(1,0)→(2,0)→(3,0)→(3,1)→(3,2), which equates to (G)→(G)→(Y)→(Y)→(Y)→(Y)→(G)→(G)→(G)→(G). In this way, each geosector 502 acts as a node of map 500 connected to other geosectors by the route ingress/egress points 504.

Efficiency module 76 would also avoid placing geosectors (2, 1) and (2, 2) along the route because traversing just one "red" geosector creates substantial risk of excessively depleting the remaining vehicle resources and thus keeping the fleet vehicle from being able to arrive at its destination.

Method

As at least partially explained above, rideshare systems are those systems which allows a user (rideshare system user) to download the reservation account to a mobile computing device and then register their reservation account by providing personal and/or payment information. The user may then use the rideshare system to request a ride from an autonomous-electric vehicle (discussed above) within a certain proximity of their location (e.g., 5-10 miles). Once confirmed, the reservation account may, for example, exhibit the vehicle's name and type, feedback/ratings from one or more previous users, and images of the requested vehicle. During the window of rideshare system services operation, the delegated vehicle will autonomously traverse to the user's location, pick the user up, autonomously taxi the user to their selected destination, and then drop the user off at the selected destination location. After the rideshare services are complete, the user may be provided an opportunity to submit their own feedback/rating of one or more of the rideshare system services. The vehicle may moreover autonomously traverse to the next request, a parking location, or a vehicle charge station (i.e., to complete the rideshare system task).

Figure 9:
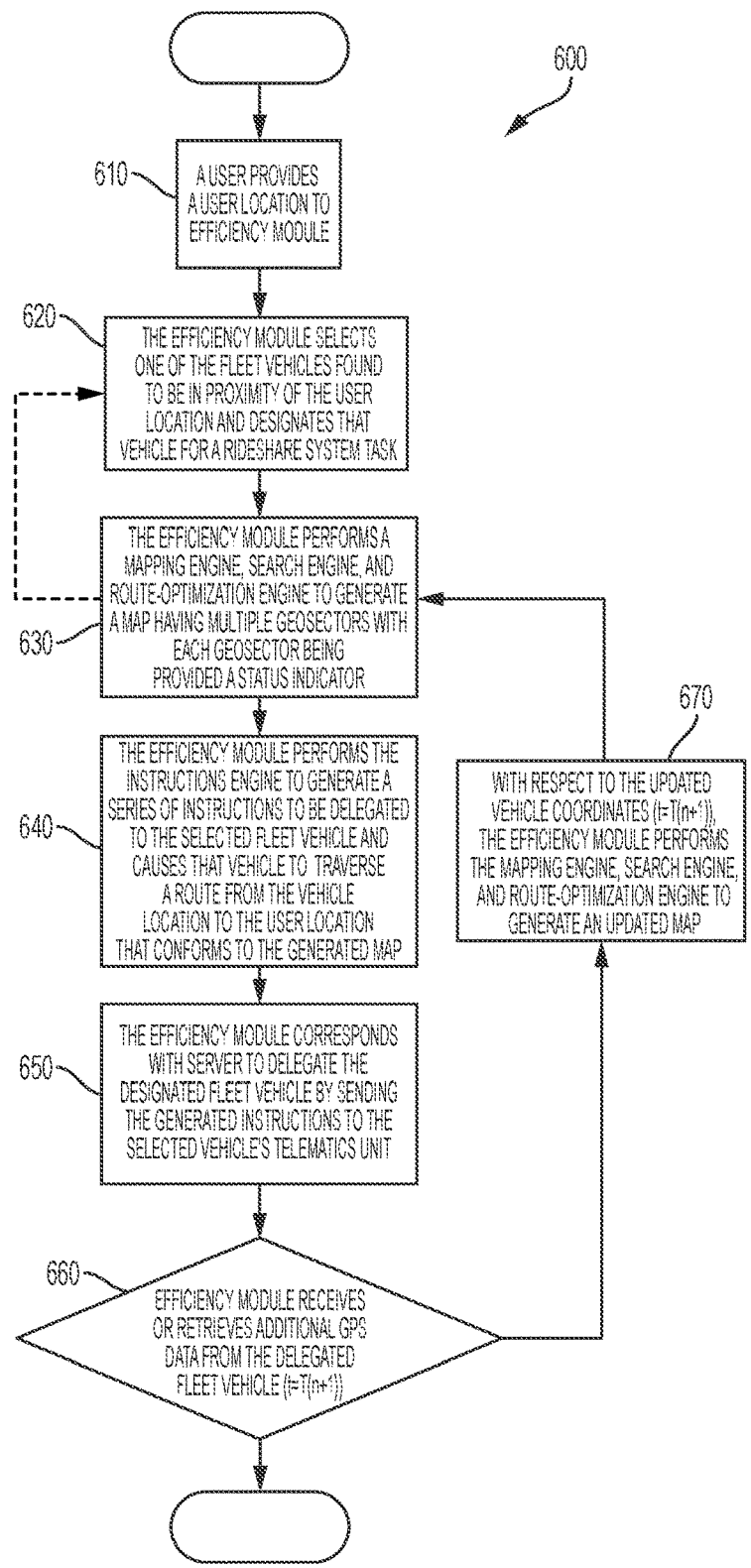
FIG. 9 is a flow chart for an exemplary methodology for providing vehicle instructions based upon the efficiency model depicted in FIG. 4.

Turning now to FIG. 9, there can be seen an application of a method to instruct delegated fleet vehicles to optimally perform one or more rideshare system tasks through the segmented geosurface route efficiency controls module 400. Aspects of this method may be executed through controller 52, for example, implementing the backend functionality of efficiency module 400 stored on database 56. Peripheral aspects may be executed through controls device 222 of the delegated fleet vehicle 12, for example, to implement the generated instructions and cause the fleet vehicle to properly traverse the generated route and optimally perform their rideshare system task.

In step 610, a user provides a user location (first location) to efficiency module 400. As discussed above, efficiency module 400 will then perform the destination interface 420 to determine the user location and then filter and format these coordinates in a suitable form. In step 620, efficiency module 400 may receive GPS data from any/all available fleet vehicles 12 (t=Tn) last known to be in proximity to the user location (e.g., 5 miles). The transit interface 410 is then performed to determine the vehicle location coordinates (for t=Tn) for each of these fleet vehicles. After all location coordinates have been filtered and formatted in a suitable form, efficiency module 400 can select one of the fleet vehicles 12 found to be in proximity of the user location and designate that vehicle for the rideshare system task.

In step 630, with respect to the vehicle location coordinates (t=Tn), efficiency module 400 will perform the mapping engine 430, search engine 440, and route-optimization engine 450 to generate a map having multiple geosectors and each geosector being provided a status indicator, as discussed above. In this step, optionally, efficiency module can review the user location with respect to the generated map to ensure the designated fleet vehicle will not traverse any geosectors having a status indicator deemed "red." When one or more geosectors are deemed "red", efficiency module 400 may return to step 620 to select another fleet vehicle 12 in proximity of the user location.

In step 640, efficiency module 400 will perform the instructions engine 460 to generate a series of instructions to be delegated to the selected fleet vehicle 12 and cause that vehicle to traverse a route from the vehicle location to the user location that conforms to the previously generated map (step 630). In step 650, efficiency module 400 will correspond with server 54 to delegate the designated fleet vehicle 12 by sending the generated instructions to the vehicle's telematics unit 24. In this step, moreover, the delegated fleet vehicle will process these instructions (via path planning module 350) to traverse this route. As a result, the fleet vehicle will retrieve the user at the user location, taxi the user to a subsequent destination location that has been selected by the user, and then move on to another user location, parking location, or charge station.

At some point after step 650, at step 660, efficiency module will either receive or retrieve additional GPS data from the delegated fleet vehicle 12 (t=T(n+1)). As a result, efficiency module 400 will rerun to the transit interface 410 to estimate the updated vehicle location coordinates. If it is determined that the new vehicle location coordinates (t=T(n+1)) remain sufficiently distant from the user location (e.g., 0.5 miles), then method 600 moves to step 670; otherwise, method 600 will move to completion. In step 670, with respect to the updated vehicle coordinates (t=T(n+1)), efficiency module 400 will perform the mapping engine 430, search engine 440, and route-optimization engine 450 to generate an updated map. Upon completion of the updated map, method 600 will return to step 640 (wherein t=T(n+1) is to become t=Tn).

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system to reduce vehicle resource depletion risk, the system comprises:

a memory configured to comprise one or more executable instructions;
a controller configured to execute the executable instructions, the controller further configured to communicate with an efficiency module;
the efficiency module configured to enable at least one fleet vehicle to optimally perform a rideshare system task, wherein the rideshare system task is optimally performed when the fleet vehicle traverses to a first location via a route that depletes less vehicle resources than would be depleted when the fleet vehicle traverses one or more alternative routes to the first location;
a mobile computing device configured to generate first location data, the mobile computing device further configured to communicate the first location data to the controller;
the fleet vehicle comprises a vehicle system and a vehicle controls device, the fleet vehicle configured to communicate with the controller, the vehicle system configured to generate second location data, the vehicle controls device configured to command the fleet vehicle to autonomously perform one or more rideshare system tasks; and
wherein the executable instructions enable the controller to:
receive the first location data transmitted from the mobile computing device;
receive the second location data transmitted from the fleet vehicle;
produce mapping data using an efficiency module which results in the form of a geosector divided geosurface map that comprises one or more geosectors;
calculate dynamic content for each geosector data using the efficiency module;
apply a statistical/probabilistic technique to the dynamic content data using the efficiency module so as to produce a dynamic status indicator for each geosector; and
produce an output, the output being partially based on the first location data and the second location data, the output configured to instruct the vehicle controls device to command the fleet vehicle to optimally perform the one or more rideshare system tasks; and
communicate the output to the fleet vehicle.

2. The system of claim 1, further comprises:
the vehicle controls device further configured to review and analyze the output and resultantly instruct the fleet vehicle so as to autonomously perform the one or more rideshare system tasks in conformity with the output.

3. The system of claim 1, wherein optimal performance of the one or more rideshare system tasks comprises the fleet vehicle making an autonomous traversal from the second location to the first location so as to retrieve a rideshare system user for the purpose of taxiing the rideshare system user from the first location to a subsequent third location selected by the rideshare system user.

4. The system of claim 1, further comprises:
a plurality of the fleet vehicles each of which comprises a vehicle system and a vehicle controls device, each fleet vehicle configured to communicate with the controller, each vehicle system configured to generate second location data, each vehicle controls device configured to command the matching fleet vehicle to autonomously perform one or more rideshare system tasks; and wherein the executable instructions further enable the controller to perform the efficiency module to:
receive second location data transmitted from each of the plurality of fleet vehicles; and
select one fleet vehicle from the plurality of fleet vehicles based, at least in part, on the availability of the selected fleet vehicle as well as on the second location data of the selected fleet vehicle in relation to the first location data.

5. The system of claim 1, wherein:
the fleet vehicle further comprises a power source configured to provide State of Charge information; and
the efficiency module calculates the dynamic content data of each geosector based, at least in part, on the State of Charge information.

6. The system of claim 1, wherein, after the output is reviewed and analyzed via the vehicle controls device, the vehicle controls device instructs the fleet vehicle to traverse from the second location to the first location in such a manner that corresponds to one or more selected geosectors of the geosurface map, wherein the one or more geosectors are each selected based, at least in part, on their correspondent dynamic status indicator.

7. The method of claim 1, wherein:
the fleet vehicle further comprises a power source configured to provide State of Charge information; and
the efficiency module calculates the dynamic content data of each geosector based, at least in part, on the State of Charge information.

8. The method of claim 1 further comprises:
receiving, via the vehicle controls device, the output;
reviewing and analyzing, via the vehicle controls device, the output; and
instructing, via the vehicle controls device, the fleet vehicle to traverse from the vehicle location to the user location in such a manner that corresponds to one or more selected geosectors of the geosurface map, wherein the one or more geosectors are each selected based, at least in part, on their correspondent dynamic status indicator.

9. The system of claim 1, wherein the dynamic status indicator for each geosector can be used to help determine how the fleet vehicle can optimally perform the rideshare system task.

10. The system of claim 1, wherein the statistical/probabilistic technique comprises the use of the dynamic content data to derive one or more weighted scores, wherein an aggregation of the one or more weighted scores produces the dynamic status indicator for each geosector.

11. The system of claim 10, wherein:
the dynamic status indicator for each geosector is configured to have a first status, second status, or third status;
wherein the first status corresponds to the weighted score of the geosector and is deemed to deplete minimal vehicle resources of the fleet vehicle;
wherein the second status corresponds to the weighted score of the geosector and is deemed to deplete a safe amount of vehicle resources of the fleet vehicle; and
wherein the third status corresponds to the weighted score of the geosector and is deemed to deplete a maximum amount of vehicle resources of the fleet vehicle.

12. A method to reduce vehicle resource depletion risk, the method comprises:
providing a memory configured to comprise one or more executable instructions;
providing a controller configured to execute the executable instructions, the controller further configured to communicate with an efficiency module, wherein the efficiency module is configured to enable at least one fleet vehicle to optimally perform a rideshare system task, wherein the rideshare system task is optimally performed when the fleet vehicle traverses to a user location via a route that depletes less vehicle resources than would be depleted when the fleet vehicle traverses one or more alternative routes to the user location;
providing a mobile computing device configured to generate user location data, the mobile computing device further configured to communicate the user location data to the controller;
providing the fleet vehicle comprises a vehicle system and a vehicle controls device, the fleet vehicle configured to communicate with the controller, the vehicle system configured to generate vehicle location data, the vehicle controls device configured to command the fleet vehicle to autonomously traverse from the vehicle location to the user location;
receiving, via the controller, the user location data transmitted from the mobile computing device;
receiving, via the controller, the vehicle location data transmitted from the fleet vehicle;
causing, via the controller, the efficiency module to produce mapping data which results in the form of a geosector divided geosurface map;
causing, via the controller, the efficiency module to calculate dynamic content data for each geosector;
causing, via the controller, the efficiency module to apply a statistical/probabilistic technique to the dynamic content data so as to produce a dynamic status indicator for each geosector;
causing, via the controller, the efficiency module to produce an output, the output being partially based on the user location data and the vehicle location data, the output configured to instruct the vehicle controls device to command the fleet vehicle to optimally perform an autonomous traversal from the vehicle location to the user location; and
communicating, via the controller, the output to the fleet vehicle.

13. The method of claim 12, further comprises:
receiving, via the controller, updated vehicle location data transmitted from the fleet vehicle; and
causing, via the controller, the efficiency module to produce an updated output, the output being partially based on the user location data and the updated vehicle location data.

14. The method of claim 12, wherein autonomously traversing from the vehicle location to the user location comprises:
retrieving, via the fleet vehicle, a rideshare system user located at the user location; and
taxiing, via the fleet vehicle, the rideshare system user to a subsequent destination location selected by the rideshare system user.

15. The method of claim 12, further comprises:
providing a plurality of the fleet vehicles each of which comprise a vehicle system and a vehicle controls device, each fleet vehicle configured to communicate with the controller, each vehicle system configured to generate vehicle location data, each vehicle controls device configured to command the matching fleet vehicle to autonomously traverse from its respective vehicle location to the user location;
receiving, via the controller, vehicle location data transmitted from each of the plurality of fleet vehicles; and selecting, via the controller, one fleet vehicle from the plurality of fleet vehicles based, at least in part, on the availability of the selected fleet vehicle as well as on the vehicle location data of the selected fleet vehicle in relation to the user location data.

16. The method of claim 12, wherein the statistical/probabilistic technique comprises:
using the dynamic content data to derive one or more weighted scores; and
aggregating of the one or more weighted scores to produce the dynamic status indicator for each geosector.

17. The method of claim 12, further comprises:
receiving, via the vehicle controls device, the output;
reviewing and analyzing, via the vehicle controls device, the output; and
instructing, via the vehicle controls device, the fleet vehicle to autonomously traverse from the vehicle location to the user location.

18. The method of claim 17, further comprises autonomously traversing, via the fleet vehicle, from the vehicle location to the user location.

19. A non-transitory and machine-readable medium having stored thereon executable instructions adapted to reduce vehicle resource depletion risk, which when provided to a controller and executed thereby, causes the controller to:
perform a destination interface of an efficiency module so as to receive user location data, the user location data being transmitted from a mobile computing device;
perform a transit interface of the efficiency module so as to receive vehicle location data, the vehicle location data being transmitted from a fleet vehicle;
perform a mapping engine and search engine of the efficiency module so as to generate mapping data in the form of a geosector divided geosurface map, the geosector divided geosurface map comprises one or more geosectors with dynamic content data;
perform a route-optimization engine of the efficiency module so as to calculate the dynamic content data of each geosector and apply a statistical/probabilistic technique to the dynamic content data so as to produce a dynamic status indicator for each geosector;
perform an instructions engine of the efficiency module to produce an output based, at least in part, on the dynamic status indicators of each geosector, the output formatted to instruct the vehicle controls device to command the fleet vehicle to optimally perform an autonomous traversal from the vehicle location to the user location, wherein optimal performance of the autonomous traversal occurs when the fleet vehicle traverses to the user location via a route that depletes less vehicle resources than would be depleted when the fleet vehicle traverses one or more alternative traversal routes to the user location; and
communicate the output to the fleet vehicle.

20. The non-transitory and machine-readable memory of claim 19, further comprises the executable instructions causes the controller to:
perform a transit interface of the efficiency module to receive vehicle location data that comprises a plurality of vehicle location coordinates, the vehicle location coordinates being transmitted from a plurality of fleet vehicles; and
select one fleet vehicle from the plurality of fleet vehicles based, at least in part, on the vehicle location coordinates for the selected fleet vehicle in relation to the user location data.

* * * * *